US007479615B2

(12) United States Patent
Gefter et al.

(10) Patent No.: US 7,479,615 B2
(45) Date of Patent: Jan. 20, 2009

(54) WIDE RANGE STATIC NEUTRALIZER AND METHOD

(75) Inventors: Peter Gefter, South San Francisco, CA (US); Scott Gehlke, Berkeley, CA (US); Alexandre Ignatenko, Hayward, CA (US)

(73) Assignee: MKS Instruments, Inc., Andover, MA (US)

( * ) Notice: Subject to any disclaimer, the term of this patent is extended or adjusted under 35 U.S.C. 154(b) by 330 days.

(21) Appl. No.: 11/136,754

(22) Filed: May 25, 2005

(65) Prior Publication Data

US 2005/0225922 A1 Oct. 13, 2005

Related U.S. Application Data

(63) Continuation-in-part of application No. 10/821,773, filed on Apr. 8, 2004, now Pat. No. 7,057,130.

(51) Int. Cl.
*B23K 10/00* (2006.01)

(52) U.S. Cl. ............................ 219/121.36; 219/121.57; 219/121.52; 156/345.47; 361/232; 250/288

(58) Field of Classification Search ............ 219/121.54, 219/121.57, 121.43, 121.59, 121.36, 121.48, 219/121.52; 361/250, 231; 250/423 F, 288
See application file for complete search history.

(56) References Cited

U.S. PATENT DOCUMENTS 5,095,400 A 3/1992 Saito (Continued)

FOREIGN PATENT DOCUMENTS

JP 5047490 2/1993

(Continued)

OTHER PUBLICATIONS

International Search Report and Written Opinion, PCT/US0509093, Jul. 28, 2005.

(Continued)

*Primary Examiner*—Mark H Paschall
(74) *Attorney, Agent, or Firm*—Uriarte Law

(57) ABSTRACT

Static neutralization of a charged object is provided by generating, in an ionizing cell or module, an ion cloud having a mix of positively and negatively charged ions, and reshaping the ion cloud by redistributing the ions into two regions of opposite polarity by using a second voltage. The second voltage creates an electrical field, which is preferably located in the vicinity of the ion cloud. The redistribution of the ions increases the effective range in which available ions may be displaced or directed towards the charged object. The electrical field redistributes ions that form the ion cloud. Ion redistribution within the ion cloud occurs because ions having a polarity corresponding to the polarity of the second voltage are repelled from the electrical field, and ions having a polarity opposite from that of the electrical field are attracted to electrical field. Redistribution of the ions into two regions of opposite polarity in the ion cloud in turn reshapes the ion cloud so that a portion of the cloud corresponding to the repelled ions is displaced by ions attracted to the electrical field, thus enhancing the range in which the ions may be dispersed or directed. This manner of redistributing ions into two regions is sometimes referred to as "ion polarization" in the disclosure herein.

33 Claims, 9 Drawing Sheets

U.S. PATENT DOCUMENTS

| | | | |
|---|---|---|---|
| 5,550,703 | A | 8/1996 | Beyer et al. |
| 5,630,949 | A | 5/1997 | Lakin |
| 5,847,917 | A | 12/1998 | Suzuki |
| 6,330,146 | B1 | 12/2001 | Blitshteyn et al. |
| 6,504,700 | B1 | 1/2003 | Hahne et al. |
| 6,636,411 | B1 * | 10/2003 | Noll ........................... 361/213 |
| 6,653,638 | B2 | 11/2003 | Fujii |
| 6,693,788 | B1 | 2/2004 | Partridge |
| 6,807,044 | B1 | 10/2004 | Vernitsky et al. |
| 6,826,030 | B2 | 11/2004 | Gorczyca et al. |
| 2002/0125423 | A1 | 9/2002 | Ebeling et al. |
| 2003/0007307 | A1 | 1/2003 | Fuiwara et al. |
| 2003/0011957 | A1 * | 1/2003 | Nilsson ...................... 361/250 |
| 2004/0130271 | A1 | 7/2004 | Sekoguchi et al. |
| 2005/0052815 | A1 | 3/2005 | Lee et al. |

FOREIGN PATENT DOCUMENTS

| | | |
|---|---|---|
| JP | 7249497 | 9/1995 |
| JP | 10055896 | 2/1998 |
| JP | 2000058290 | 8/1998 |
| JP | 11273893 | 9/1999 |
| JP | 10268895 | 2/2000 |
| JP | 2002216994 | 9/2002 |
| WO | WO0038484 | 6/2000 |

OTHER PUBLICATIONS

Partial translation of Japanese Patent Abstract 2000058290—published Feb. 25, 2000, application date Aug. 17, 1998 as application No. 10268895.

* cited by examiner

FIG. 4A
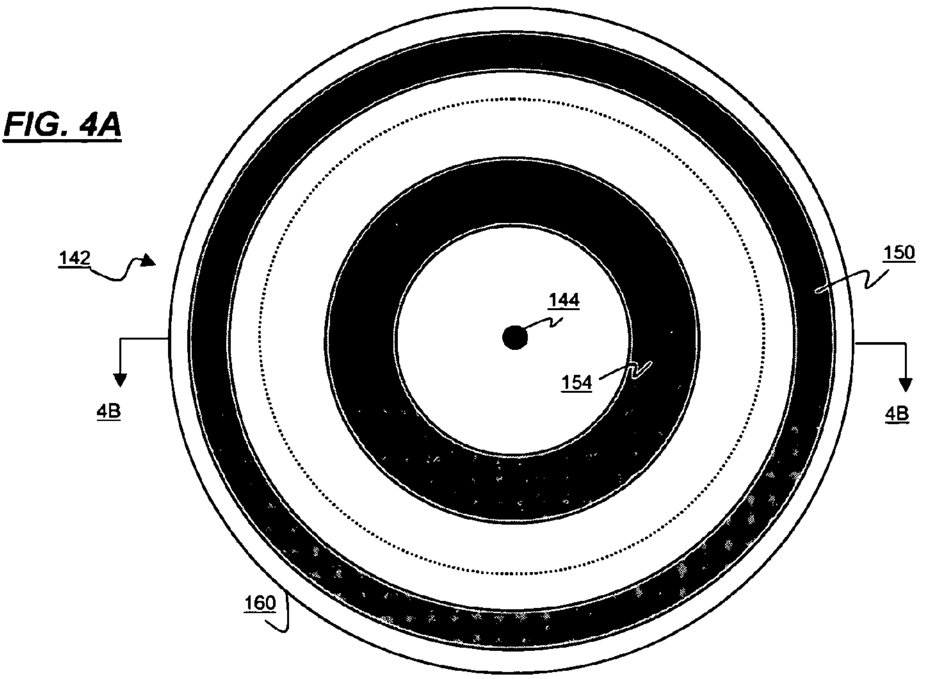
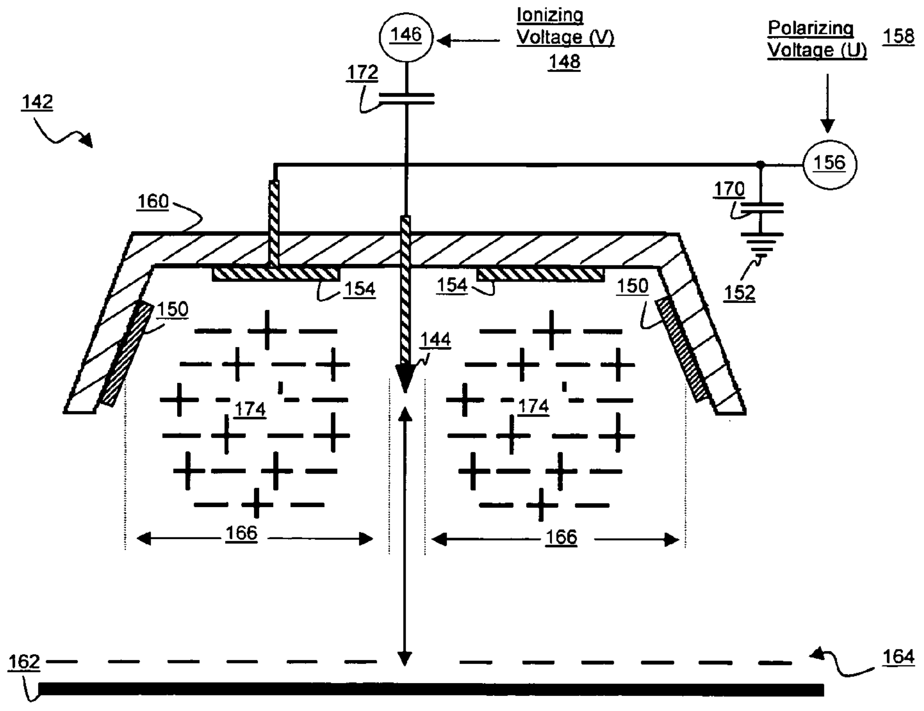
FIG. 4B

WIDE RANGE STATIC NEUTRALIZER AND METHOD

CROSS-REFERENCE TO RELATED APPLICATIONS

This application is a continuing-in-part application, which claims the benefit of U.S. patent application, entitled "Ion Generation Method and Apparatus, having Ser. No. 10/821,773, and filed on Apr. 8, 2004.

BACKGROUND OF THE INVENTION

1. Field of the Invention

The present invention relates to a method and apparatus for electrostatic neutralization, and more particularly, to an electrostatic neutralizer and method for neutralizing a charged object that has a distance within a relatively wide range from an ion generating source.

2. Description of the Related Art

Electrostatic neutralizing ionizers that generate positive and negative ions by corona discharge are known in the art. These conventional ionizers typically limit the distance an object targeted for neutralization may be positioned away from an area from which ions are generated by the corona discharge. In addition, power supplies that generate alternating and relatively high voltages, e.g., (+/−) 15 kV, are typically used in conventional ionizers to maximize the number of negative and positive ions that are generated over a given time period. In other implementations, a gas, such as air or nitrogen, is also used to dispense the generated ions towards the charged object. Using high voltages, gas, or both increases the cost to produce and use such conventional ionizers. Generating an alternating high voltage that is sufficient to generate a relatively large number of negative and positive ions requires a more expensive power supply and results in the power supply having a size and weight that are generally difficult to reduce. Using gas also adds expense because in certain environments the gas must be relatively free of unwanted particles to avoid contaminating the ionizing electrode and the object targeted for neutralization. Moreover, using a gas other than air also adds the further expense of acquiring the gas. Consequently, there is a need for an improved electrostatic neutralizer and method for neutralizing a charged object having a distance within a relatively wide range, such as from 1 to 100 inches, from an ion generating source.

BRIEF SUMMARY OF THE INVENTION

Static neutralization of an object is provided by a method and apparatus that respectively generate an ion cloud having a mix of positively and negatively charged ions, which are generated by using an ionizing voltage having a frequency and an amplitude that varies over time; and reshape the ion cloud by redistributing the ions into two regions of opposite polarity by using a second voltage.

BRIEF DESCRIPTION OF THE DRAWINGS

FIG. 4A is a bottom view of an ionizing cell in accordance with fourth embodiment of the present invention;

FIG. 4B is a sectional view along line 4B-4B of the ionizing cell illustrated in FIG. 4A;

DETAILED DESCRIPTION OF THE INVENTION

Figure 1A:
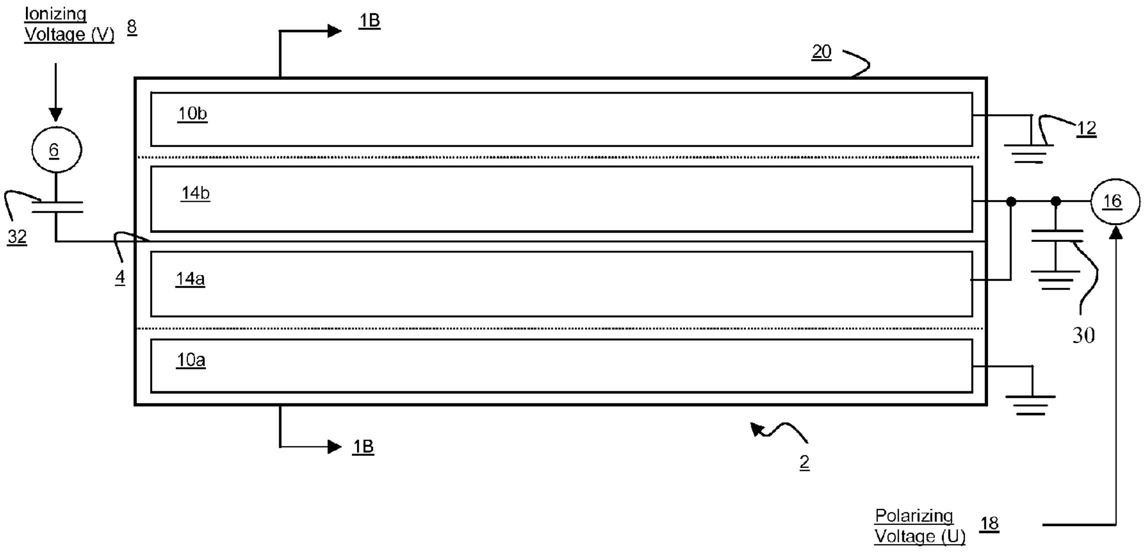
FIG. 1A is a bottom view block illustration of an ionizing cell in accordance with first embodiment of the present invention.

While the invention has been described in conjunction with a specific best mode, it is to be understood that many alternatives, modifications and variations will be apparent to those skilled in the art in light of the following description. The use of these alternatives, modifications and variations in the embodiments of the invention shown below would not require undue experimentation or further invention.

The various embodiments of the present invention, described below, are generally directed to the static neutralization of charged objects using an alternating high voltage, named "ionizing voltage", and a corona discharge to generate a mix of positively and negatively charged ions, sometimes collectively referred to as a "bipolar ion cloud". The corona discharge may be performed in an ionizing cell or module having at least one electrode that has a shape suitable for emitting ions, hereinafter referred to as "ionizing electrode", and at least one other electrode for receiving a reference voltage, such as ground. Applying the ionizing voltage to the ionizing electrode creates the bipolar ion cloud when the ionizing voltage, which is measured between the ionizing electrode and reference electrode, reaches or exceeds the corona onset voltage threshold for the ionizing cell. The corona onset voltage threshold is typically a function of the parameters of the ionization cell and, when met or exceeded by the ionizing voltage, is the voltage level in which the bipolar ion cloud is generated.

To increase the effective range in which available ions may be displaced or directed towards a charged object, the examples below disclose the creation of an electrical field, named "polarizing electrical field". This polarizing electrical field may be created by the application of a second voltage, hereinafter "polarizing voltage", to at least one electrode, hereinafter "polarizing electrode", that is in the vicinity of the bipolar ion cloud. In the embodiments disclosed below, this polarizing electrode is included in the ionizing cell in addition to the ionizing electrode and reference electrode.

The polarizing electrical field redistributes ions that form the bipolar ion cloud. Ion redistribution within the ion cloud occurs because ions having a polarity corresponding to the polarity of the polarizing voltage are repelled from the field, and ions having a polarity opposite from that of the polarizing electrical field are attracted to polarizing field. Redistribution of the ions into two regions of opposite polarity in the ion cloud in turn reshapes the bipolar ion cloud so that a portion of the cloud corresponding to the repelled ions is displaced by ions attracted to the polarizing field, thus enhancing the range in which the ions may be dispersed or directed. This manner of redistributing ions into two regions is sometimes referred to as "ion polarization" in the disclosure herein.

The effectiveness of using a polarizing voltage to increase the dispersal range of ions may be further enhanced by adding the following enhancements, in any combination: adjusting the voltage potential, frequency or both of the ionizing voltage relative to the geometry and gap spacing between reference electrodes and the mobility of the ions, which may be collectively expressed by equation [1] described below, applying a stream of gas, such as air, nitrogen and the like, to the ions generated, adjusting the voltage potential of the polarizing voltage, adjusting the frequency of the polarizing voltage, and shaping the structure and electrodes used in an ionizing cell.

Figure 1B:
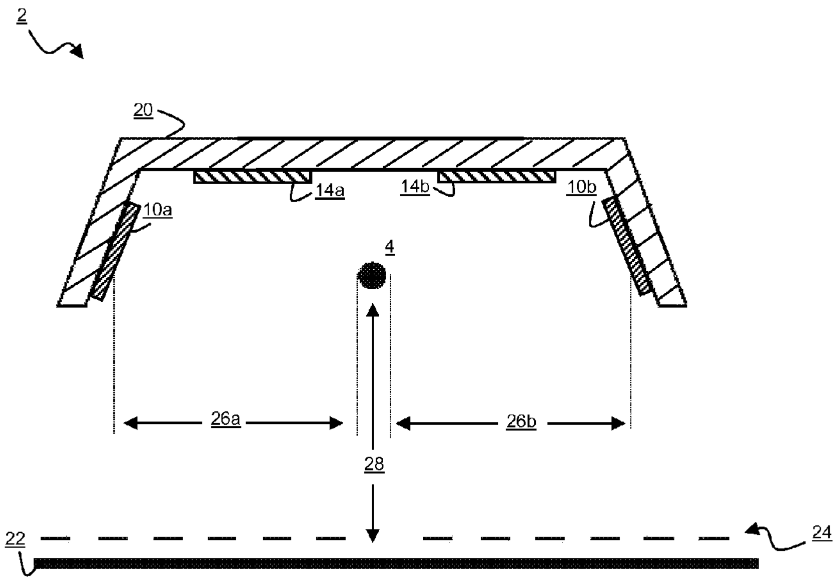
FIG. 1B is a sectional view along line 1B-1B of the ionizing cell illustrated in FIG. 1A.

Referring now to FIGS. 1A and 1B, an ionizing cell 2 is illustrated in accordance with a first embodiment of the present invention. Ionizing cell 2 includes an electrode 4 having a connection 6 that can receive a first voltage, such as ionizing voltage 8, electrodes 10*a* and 10*b* connected to a reference voltage such as ground 12 (hereafter named reference electrodes 10*a* and 10*b*, respectively), electrodes 14*a* and 14*b* having a connection 16 that can receive a second voltage, such as polarizing voltage 18, and a structure 20 providing a mechanical and electrically insulating support for electrode 4.

Electrode 4 has a shape that is suitable for generating ions by corona discharge and in the example shown in FIGS. 1A and 1B is in the form of a filament or wire. Using a filament or wire to implement ionizing electrode 4 is not intended to limit the scope of various embodiments disclosed herein. One of ordinary skill in the art would readily recognize that other shapes may be used when implementing electrode 4, such as an electrode having a sharp point or a small tip radius, a set of more than one sharp point or equivalent ionizing electrode. To facilitate the discussion below, electrode 4 is hereinafter referred to as an "ionizing electrode". As will be described below, electrodes 14*a* and 14*b* (hereinafter called "polarizing electrodes") are used to redistribute the ions within a bipolar ion cloud created by ionizing electrode 4 when ionizing voltage 8 is applied, displacing and redistributing a portion of ions comprising the bipolar ion cloud closer to a charged object 22 having a surface charge 24. Object 22 can be stationary or in motion during neutralization.

Reference electrodes 10*a* and 10*b* and polarizing electrodes 14*a* and 14*b* are shown to each have a relatively flat surface that are generally directed toward ionizing electrode 4. Using a relatively flat surface for reference electrodes 10*a* and 10*b* and polarizing electrodes 14*a* and 14*b* is not intended to limit the described embodiment in any way. Reference electrodes 10*a* and 10*b* and polarizing electrodes 14*a* and 14*b* of other shapes may also be used, including a shape having a cross-section similar to that of a circle or semi-circle.

The placement of reference electrodes 10*a* and 10*b* should form gaps 26*a* and 26*b* within the range of 5 E-3 m to 5 E-2 m. Electrodes 4, 10*a*, 10*b*, 14*a* and 14*b* may be placed at a location near object 22 using structure 20 so that distance 28 is within the range in which available neutralizing ions may be displaced or directed effectively towards charged object 22. This effective range is currently contemplated to be from a few multiples of the gap spacing, such as the gap spacing defined by gap 26*a* or gap 26*b*, to 100 inches. Structure 20 should be electrically non-conductive and insulating to an extent that its dielectric properties would minimally affect the creation and displacement of ions as disclosed herein. It is suggested that the dielectric properties of structure 20 be in the range of resistance of between 1 E11 to 1 E15Ω and have a dielectric constant of between 2 and 5.

Ionizing cell 2 may also include a filter 30 to shunt current induced when ionizing voltage 8 is applied to ionizing electrode 4 and to permit polarizing voltage 18 to reach polarizing electrodes 14*a* and 14*b*. Filter 30 may be any device that can perform this described function and in the example shown in FIG. 1A may be a capacitor having a value within the range of 10 and 1000 pF. Ionizing cell 2 may also include a filter 32, such as a capacitor having a value within the range of 20-1000 pF, to decouple partially ionizing electrode 4 from ionizing voltage 8, enhancing the production of both positively and negatively charged ions. Filter 32 functions as a high pass filter, removing low frequency and DC components of ionizing voltage 6. Filter 32 also provides a self-balancing function to ionizing cell 2 by electrically balancing the production of positive and negative ions comprising the bipolar ion cloud created during operation.

Figure 2A:
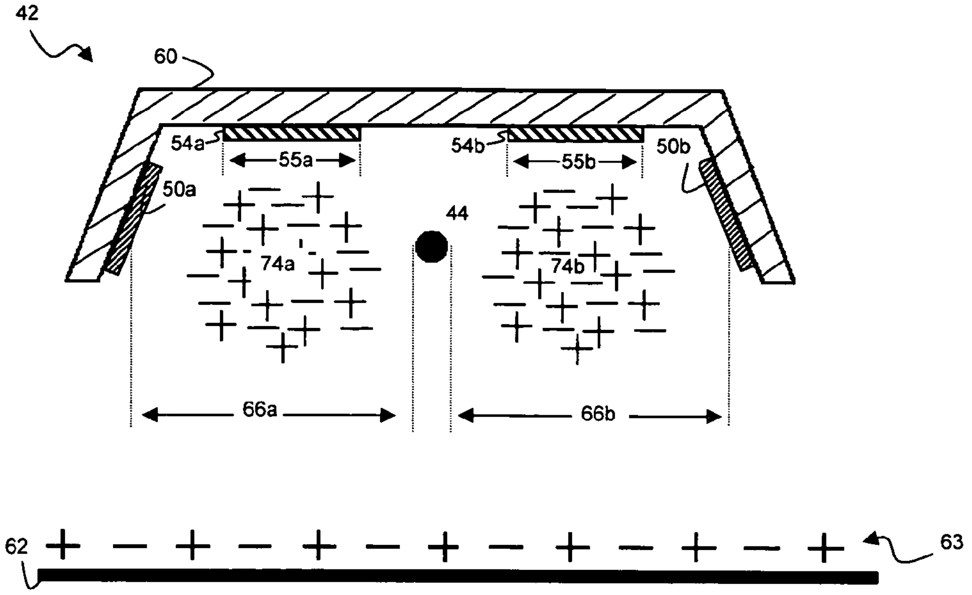
FIGS. 2A-2D illustrate the creation and polarization of bipolar ion clouds in accordance with a second embodiment of the present invention.
Figure 2B:
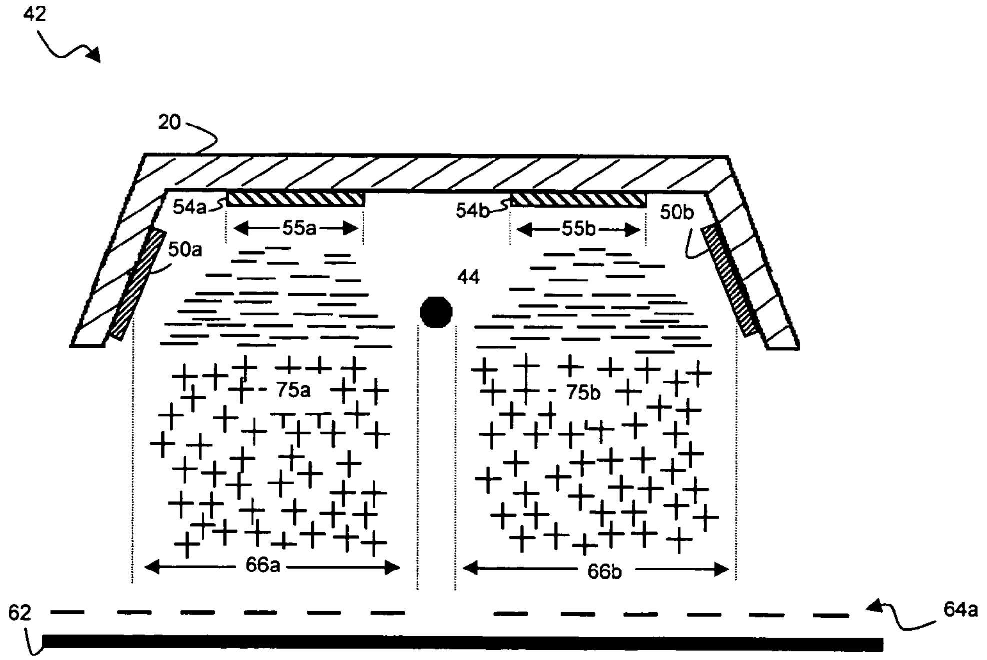
Figure 2C:
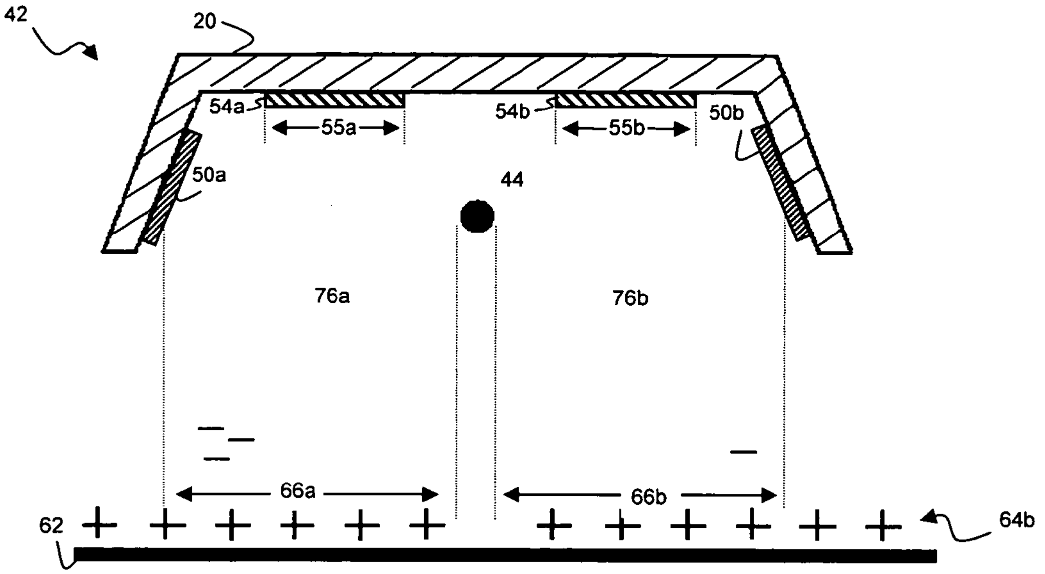

FIGS. 2A-2D illustrate the redistribution or polarization of bipolar ion clouds over a given time period in accordance with a second embodiment of the present invention. FIGS. 2A-2C are sectional illustrations of an ionizing cell 42 having substantially the same elements and function as ionizing cell 2 described above, including an ionizing electrode 44 for receiving an ionizing voltage, reference electrodes 50*a* and 50*b* for receiving a reference voltage such as ground, polarizing electrodes 54*a* and 54*b* for receiving a polarizing voltage and a structure 60.

The space between ionizing electrode 44 and reference electrode 50*a* defines gap 66*a*, while the space between ionizing electrode 44 and reference electrode 50*b* defines gap 66*b*. Gap 66*a* and gap 66*b* are substantially equal in this example embodiment.

Figure 2D:
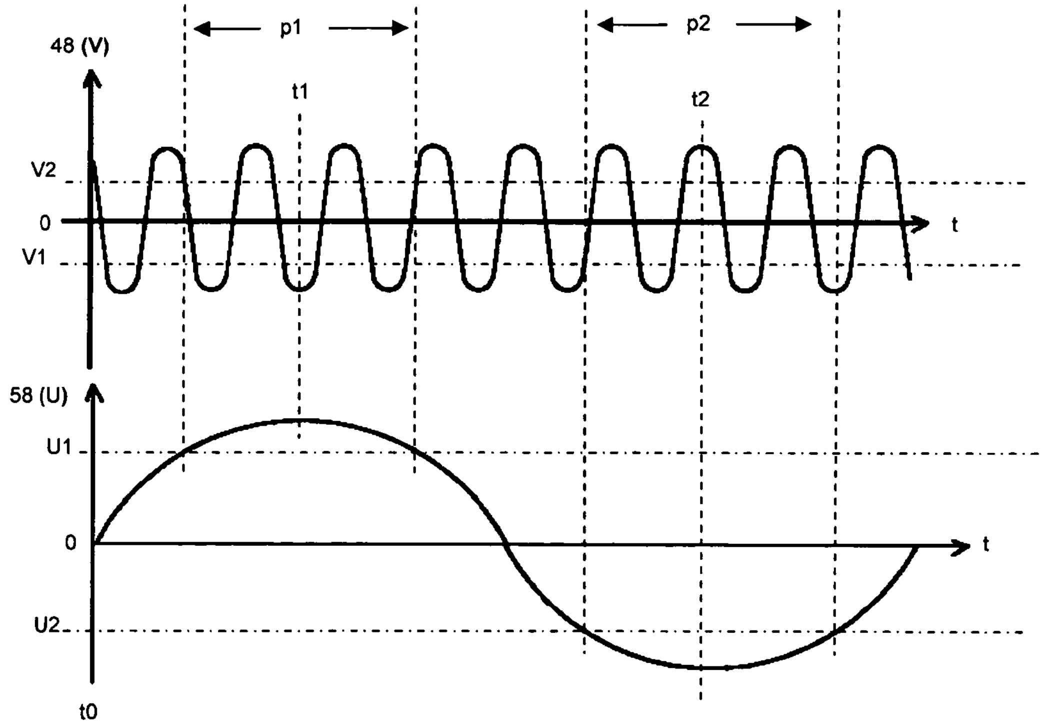

In FIGS. 2A and 2D, at time t0, an ionizing voltage (V) 48 is applied to ionizing electrode 44. Ionizing voltage 48 has an alternating frequency within the range of approximately 1 kHz to 30 kHz, preferably between 6 and 10 kHz, and has positive and negative voltage potentials that are high enough to create bipolar ion clouds by corona discharge within gaps 66*a* and 66*b*. Also, at time t0 polarizing voltage 58 (U) is equal to zero.

The application of ionizing voltage 48 causes ions comprising bipolar ion clouds 74*a* and 74*b* to oscillate respectively between ionizing electrode 44 and reference electrode 50*a* and between ionizing electrode 44 and electrode 50*b*. Further details may be found in U.S. patent application, having Ser. No. 10/821,773, entitled "Ion Generation Method and Apparatus", hereinafter referred to as the "Patent".

The polarizing effectiveness of the polarizing electrodes used in an ionizing cell is dependent on many factors, including the shape and position of the polarizing electrodes used and the position of the weighted center of the bipolar ion cloud within the gap defined between the polarizing electrode and reference electrode. In the embodiment shown, the weighted center of bipolar ion clouds 74*a* and 74*b* should be aligned with the respective centers, 55*a* and 55*b*, of polarizing electrodes 54*a* and 54*b* to fully maximize the ion polarization of bipolar ion clouds 74*a* and 74*b*.

Respectively positioning the weighted centers of bipolar ion clouds 74*a* and 74*b* within gaps 66*a* and 66*b* may be accomplished by empirical means or by using the following equation, which is also taught in the Patent:

$$V=\mu*F/G^2 \quad [1]$$

where V is the voltage difference between ionizing electrode 44 and a reference electrode, such as reference electrodes 50*a* or 50*b*, μ is the average mobility of positive and negative ions, F is the frequency of ionizing voltage 48 and G is equal to the size of gap between ionizing electrode 44 and the reference electrode, such as gaps 66*a* or 66*b*, respectively.

Equation [1] characterizes, among other things, the relationship of the voltage and frequency of an ionizing voltage with the position of the weighted center of a bipolar ion cloud within the gap formed between an ionizing and a reference electrode, such as gap 66*a*, which is formed between ionizing electrode 44 and reference electrode 50*a* and gap 66*b*, which is formed between ionizing electrode 44 and reference electrode 50*b*.

Aligning the center of polarizing electrodes 54*a* and 54*b* with the approximately middle of gaps 66*a* and 66*b*, enhances the positioning of the respective weighted centers of bipolar ion clouds 74*a* and 74*b* near the center of polarizing electrodes 54*a* and 54*b*. This alignment may be accomplished by adjusting the amplitude, frequency or both of ionizing voltage 48. However, it has been found that the most convenient method of adjusting the position of bipolar ion clouds 74*a* and 74*b* is by adjusting the amplitude of ionizing voltage 48, while keeping the gaps between the ionizing electrode and reference electrodes in the range of 5 E-3 m and 5 E-2 m and the frequency of ionizing voltage 48 in the range 1 kHz and 30 kHz, and assuming an average light ion mobility in the range of 1 E-4 to 2 E-4 [m2/V*s] at 1 atmospheric pressure and a temperature of 21 degrees Celsius.

Although equation [1] characterizes an ionizing cell having an ionizing electrode and reference electrodes that are relatively flat, one of ordinary skill in the art after reviewing this disclosure and the above referred U.S. patent application would recognize that the centered position of an oscillating bipolar ion cloud can be characterized using the above mentioned variables for other configurations and/or shapes of an ionizing electrode and reference electrode(s).

During static neutralization, polarizing voltage 58 (U) is also applied, polarizing the bipolar ion clouds created by ionizing voltage 46 (V), which causes some of the ions to be redirected and displaced into separate regions, and increasing the range in which ionizing cell 42 can disperse neutralizing ions towards charged object 62 that has a surface charge 63.

For example, as shown in FIG. 2B, during the time period designated p1 in FIG. 2D, ionizing voltage 48 equals and exceeds negative and positive corona onset voltage thresholds V1 and V2, respectively, at least once—generating bipolar ion clouds 74*a* and 74*b*. Also during time period p1, polarizing voltage 58 reaches and exceeds a positive polarization voltage threshold U1 , which forms polarized ion clouds 75*a* and 75*b* by causing a number of ions to be respectively redirected and displaced into separate regions in each of the polarized ion clouds, increasing the ion neutralization and dispersal range of ionizing cell 42. Polarization occurs because negatively charged ions are attracted to the positive electrical field (not shown), created by applying polarizing voltage 58 to polarizing electrodes 54*a* and 54*b*, and positively charged ions are repelled from polarizing electrodes 54*a* and 54*b*.

In addition, since in this example, charged object 62*a* has a negatively charged surface 64*a*, the positively charge ions are also pulled to the opposite potential of charged object 62*a*, further increasing the range and efficiency by which neutralizing ions can be dispersed toward charged object 62*a*. Moreover, the polarization of bipolar ion clouds 74*a* and 74*b* decreases ion recombination, which further still increases the efficiency of ionizing cell 42 to perform static neutralization since less electrical energy is needed to create ions which would otherwise been lost due to ion recombination.

In another example, as shown in FIG. 2C and during time period p2 in FIG. 2D, ionizing voltage 48 reaches and exceeds negative and positive corona onset voltage thresholds $V_1$ and V2, respectively, at least once—generating ion clouds, which are similar to bipolar ion clouds 74*a* and 74*b*, that respectively oscillate between within gaps 66*a* and 66*b*. Also during time period p2, polarizing voltage 58 reaches and exceeds a negative polarization voltage threshold U2, which forms polarized ion clouds 76*a* and 76*b* by causing a number of ions to be redirected and displaced into separate regions in each of the bipolar ion clouds, increasing the ion neutralization and dispersal range of ionizing cell 42. Polarization occurs because positively charged ions are attracted to the negative electrical field (not shown) and negatively charged ions are repelled from polarizing electrodes 54*a* and 54*b*.

Further, since in this example, charged object 62 has a positively charged surface 64*b*, the positively charge ions are pulled to the opposite potential of charged surface 64, further increasing the range and efficiency by which neutralizing ions can be dispersed toward charged object 62*a*. The use of a charged object having a selected polarity is not intended to limit the scope and spirit of the present invention as taught in the examples disclosed in FIG. 2A-2D above. Any charged object having any polarity may be neutralized effectively as disclosed herein.

The frequency of polarizing voltage 58 may be selected in the range of 0.1 and 100 Hz but this frequency is not intended to limit the present invention in any way. Indeed, the polarizing voltage 58 frequency may be also selected in the range of 0.1 and 500 Hz. Polarizing voltage 58 may also include a DC offset (not shown) for balancing the number of positive and negative ions generated. The voltage and the DC offset for polarizing voltage 58 may be less than the threshold voltage that will create a corona discharge, which in the embodiment disclosed herein, is typically within +/−10 to 3000V.

Providing a polarizing voltage 58 in the form of a sine waveform is not intended to limit in any way the scope and spirit of the claimed inventions as taught by the various embodiments herein. Other types of waveforms may be used to provide the polarization effect described above, including wave forms in the form of a square, trapezoid and the like.

Although polarizing voltage 58 reaches a peak positive voltage that occurs exactly when ionizing voltage 48 reaches a peak negative voltage at time t1 and polarizing voltage 58 is shown to have peak negative voltage that occurs exactly when ionizing voltage 48 reaches a peak positive voltage at time t2, the embodiment shown and described in FIGS. 2A through 2D is not intended to be so limited. The frequencies disclosed for ionizing voltage 48 and polarizing voltage 58 do not have to be selected so that they have peak voltages that synchronize in the manner shown in FIG. 2D but should simply be within the frequency ranges that achieve the inventive aspects as described herein.

Figure 3:
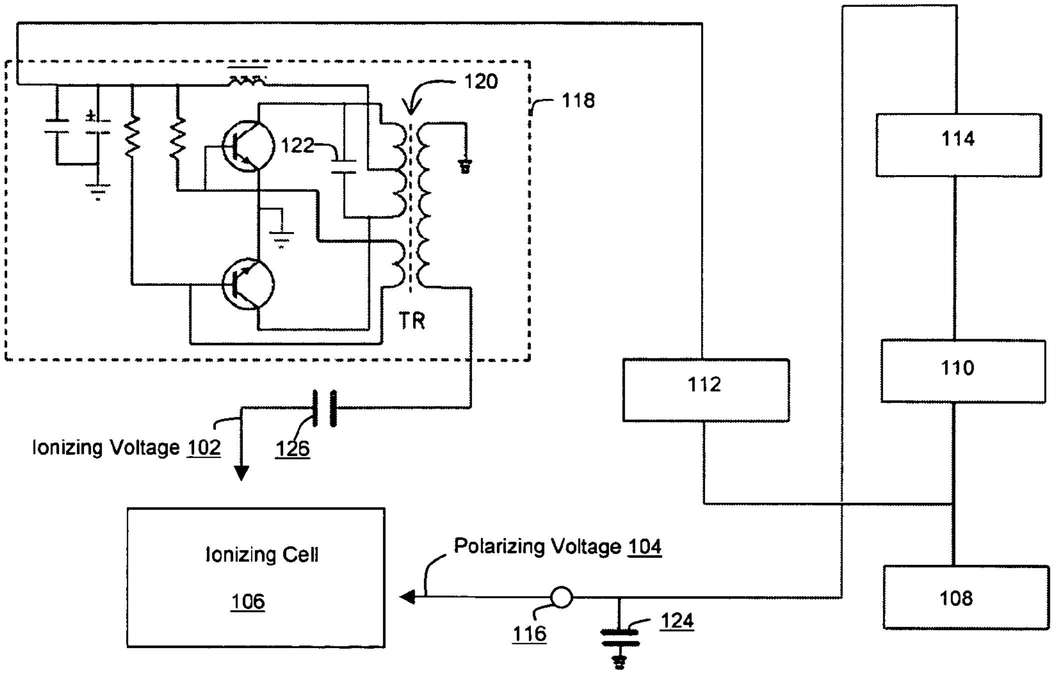
FIG. 3 is a schematic block diagram of a power supply in accordance with a third embodiment of the present invention.

In accordance with a third embodiment of the present invention, a schematic block diagram in FIG. 3 illustrates a power supply 100 that generates an ionizing voltage 102 and polarizing voltage 104 for use with a bipolar ionizing cell 106 having substantially the same elements and function as ionizing cell 42, including ionizing and polarizing electrodes. Ionizing voltage 102 and polarizing voltage 104 are intended to be respectively coupled to the ionizing and polarizing electrodes (not shown) of ionizing cell 106.

Power supply 100 includes a DC power supply 108 coupled to an adjustable frequency generator 110 and a current regulator 112. During operation, adjustable frequency generator 110 generates an output frequency in the range of 0.1 to 500 Hz, which is amplified by high voltage amplifier 114, rendering polarizing voltage 104 available at polarizing output 116. Current regulator 112 receives power from DC power supply 108 and regulates the current delivered to high voltage frequency generator 118.

High voltage frequency generator 118 is a Royer-type high voltage frequency generator and generates ionizing voltage 102 having a frequency that is defined by the inductance of the primary coil of transformer 120 and the value of capacitor 122. The maximum absolute peak voltage of ionizing voltage 102 is adjustable using current regulator 112. Royer high voltage frequency generators are well-known by those of ordinary skill in the art.

Power supply 100 may also include a filter 124, such as a capacitor having a value of 10-1000 pF, to minimize or eliminate any voltage potentials that might be induced by ionizing voltage 102 on polarizing output 116 because polarizing output 116 would be connected to the polarizing electrodes (not shown) of ionizing cell 106 during operation. Filter 126 functions as a high pass filter and may be implemented using a capacitor having a value of 20-1000 pF. Filters 124 and 126 may be omitted if ionizing cell 106 has a structure and function similar to ionizing cell 2 disclosed earlier above and ionizing cell 106 is configured with filters equivalent to 124 and 126.

In addition, neither the use or shape of ionizing cell 42, ionizing electrode 44, reference electrodes 50*a* and 50*b*, polarizing electrodes 54*a* and 54*b* and structure 60 nor the number of electrodes used to generate a source of ions for neutralizing the static charge of a charged object are intended to limit the embodiment shown in FIG. 3 or any of the embodiments disclosed herein.

For example, an ionizing cell 142 may be implemented in the form shown in FIGS. 4A and 4B. Ionizing cell 142 includes an electrode 144 having a connection 146 that can receive a first voltage, such as ionizing voltage 148, a reference electrode 150 connected to a reference voltage such as ground (not shown), a polarization electrode 154 having a connection 156 that can receive a second voltage, such as a polarizing voltage 158, and a structure 160.

Electrode 144 has a shape that is suitable for generating ions by corona discharge and, in the example shown in FIGS. 4A and 4B, has an end in the form of a sharp point or rod with a small radius tip. Using a sharp point to implement electrode 144 is not intended to limit the scope of various embodiments disclosed herein. One of ordinary skill in the art would readily recognize that other shapes may be used when implementing electrode 144, such as a set of more than one sharp points, filament or equivalent ionizing electrode.

Connections 146 and 156, electrodes 144, 150 and 154, and filters 170 and 172 have functions and structures that are respectively similar to their corresponding elements described in FIGS. 1A and 1B, except that electrodes 150 and 154 are implemented as electrically contiguous surfaces. Filters 170 and 172 are optional, as previously described. Structure 160 is roughly in the form of an upside-down concave surface, as shown, and has non-conductive properties that are similar to structure 20 described above. In addition, reference electrode 150 should be placed within structure 160 so that gaps 166*a* and 166*b* (see FIG. 4*b*) are formed between it and electrode 156 within the range of 5 E-3 m to 5 E-2 m.

Electrode 154 is used to redistribute ions within a bipolar ion cloud 174 created when ionizing voltage 148 is applied to electrode 144. The redistribution of the ions displaces and directs a portion of the redistributed ions closer to a charged object 162 having a surface charge 164. Object 162 may be stationary or in motion during neutralization. In addition, an electrostatic neutralizer may be configured with more than one instance of ionizing cell 142 that are arranged in a linear or other manner, depending on the configuration of the charged object intended for static neutralization.

Figure 5A:
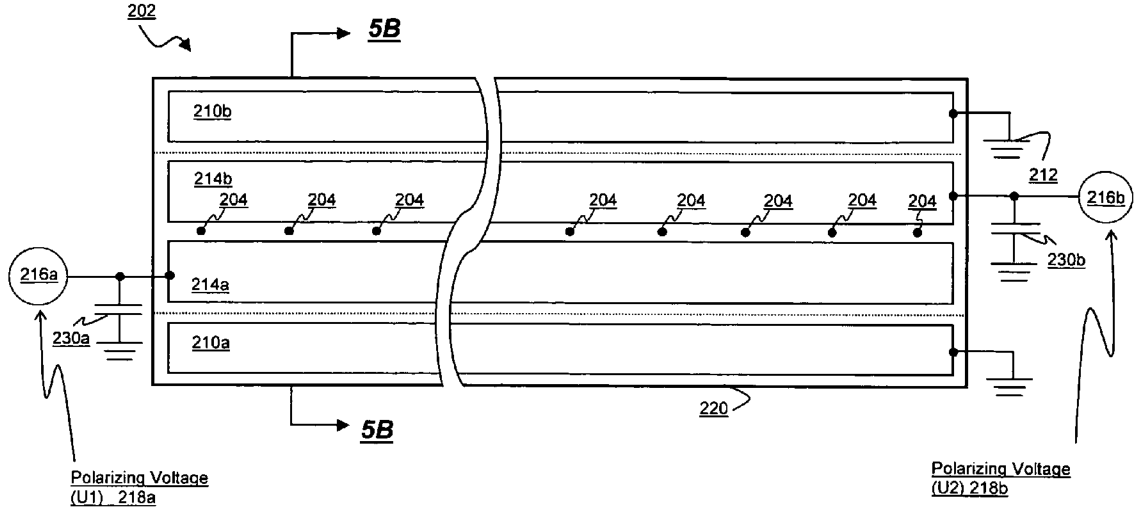
FIG. 5A is a bottom view of an ionizing cell in accordance with fifth embodiment of the present invention.
Figure 5B:
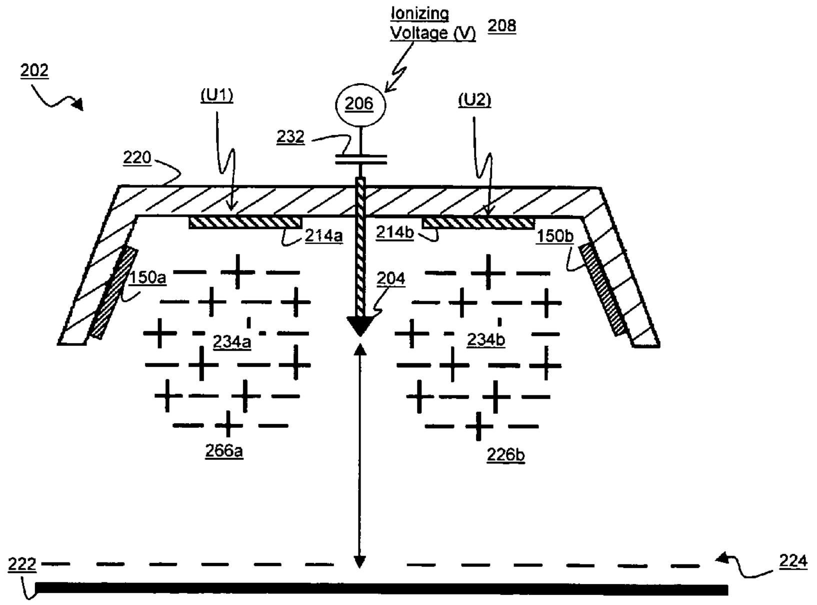
FIG. 5B is a sectional view along line 5B-5B of the ionizing cell illustrated in FIG. 4A.

In accordance with a fifth embodiment of the present invention, FIGS. 5A and 5B illustrate an ionizing cell 202 having electrodes 214*a* and 214*b* for receiving polarizing voltages 218*a* and 218*b*, respectively; at least one instance of ionizing electrode 204 for receiving, via a connection 206, ionizing voltage 208; electrodes 210*a* and 210*b* for receiving a reference voltage, such as ground 212; and a structure 220.

Each ionizing electrode 204 has a shape that is suitable for generating ions by corona discharge and, in the example shown in FIGS. 5A and 5B, has one end in the form of a sharp point. Using a sharp point to implement electrode 204 is not intended to limit the scope of various embodiments disclosed herein. One of ordinary skill in the art would readily recognize that other shapes may be used when implementing electrode 204, such as an electrode having the shape of a filament or equivalent ionizing electrode.

Connections 206, 216*a* and 216*b*, electrodes 210*a* and 210*b*, structure 220, filters 230*a* and 230*b* and filter 232 have functions and structures that are respectively similar to their corresponding elements described in FIGS. 1A and 1B. Ionizing voltage 208 (see FIG. 5B) has an electrical characteristic substantially similar to that described for ionizing voltage 148 above. Object 222 may be stationary or in motion during neutralization.

Electrodes 214*a* and 214*b* are used as polarizing electrodes and share substantially the same function as electrodes 14*a* and 14*b* described above, except in this example, they are not electrically coupled to each other. Polarization voltages 218*a* and 218*b* have voltage and frequency characteristics substantially similar to voltages 258*a* and 258*b*, which are described in FIGS. 6A-6D below.

Figure 6A:
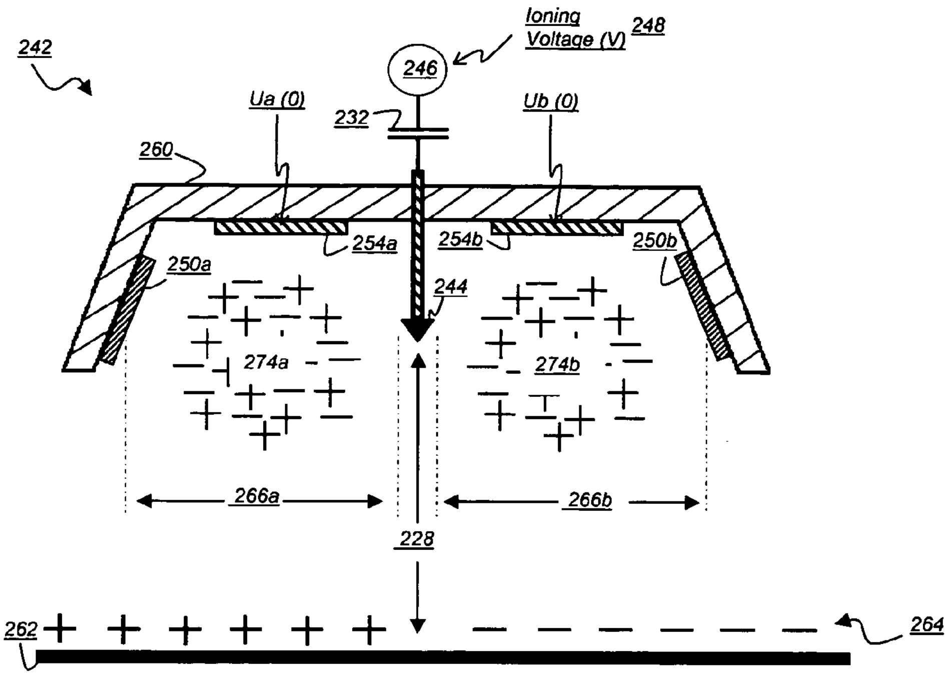
FIGS. 6A-6D illustrates the creation and polarization of bipolar ion clouds in accordance with a seventh embodiment of the present invention.
Figure 6B:
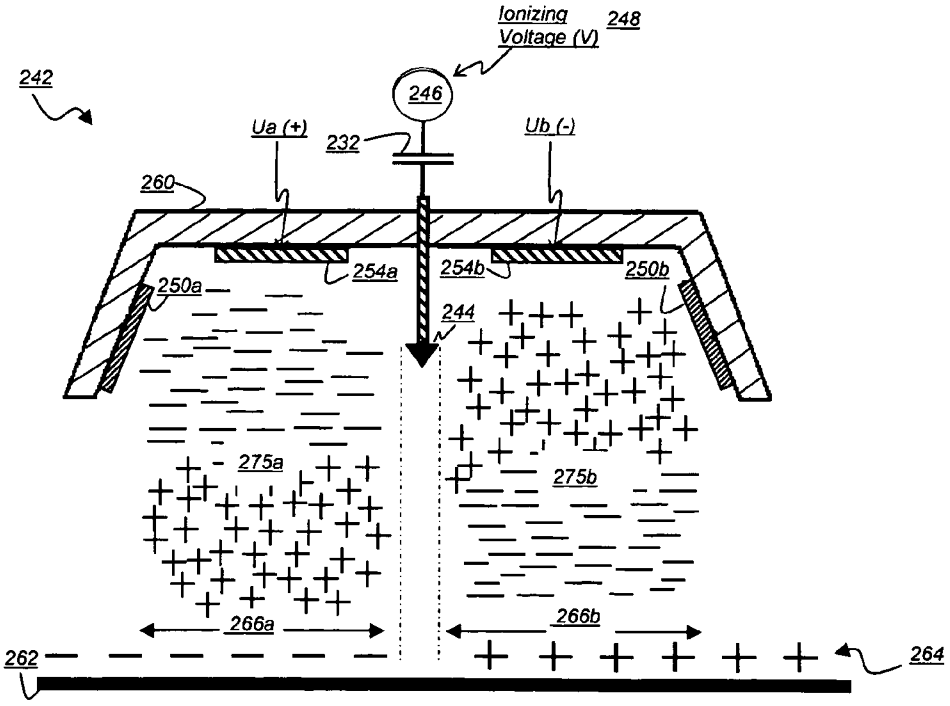
Figure 6C:
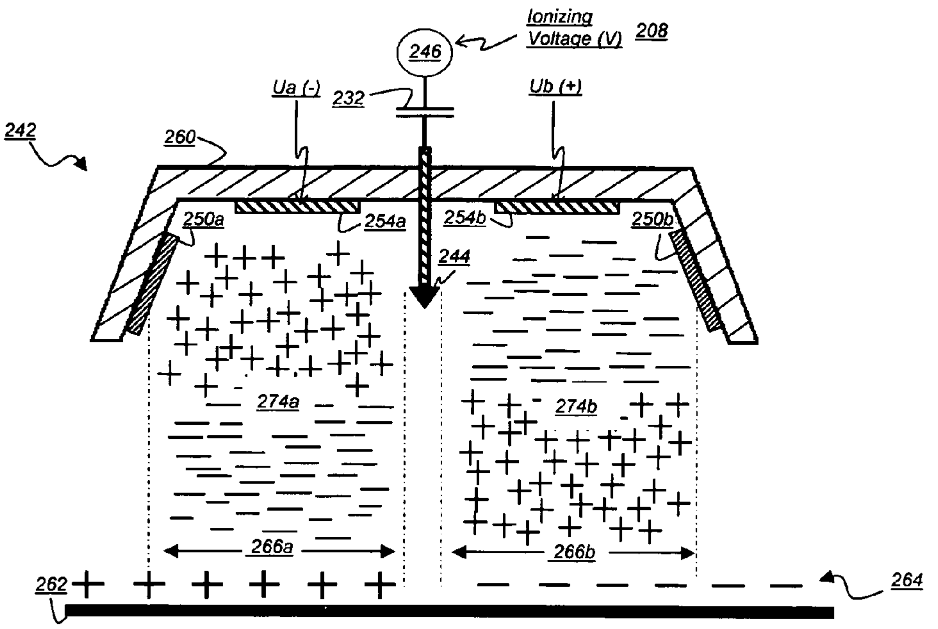

FIGS. 6A-6C are sectional illustrations of an ionizing cell 242 having substantially the same elements and function as ionizing cell 202 described in FIGS. 5A and 5B, including an ionizing electrode 244 having a connection 246 for receiving an ionizing voltage 248, reference electrodes 250*a* and 250*b* for receiving a reference voltage such as ground, polarizing electrodes 254*a* and 254*b* for receiving respectively voltages 258*a* and 258*b*, and a structure 260. The space between ionizing electrode 244 and reference electrode 250*a* forms gap 266*a*, while the space between ionizing electrode 244 and reference electrode 250*b* forms gap 266*b*.

Ionizing cell 242 may also be configured in substantially the same manner as ionizing cell 202 with filters (not shown) respectively coupled to reference electrodes 250*a* and 250*b* and with filter 232, which are substantially equivalent to filters 230*a*, 230*b* and 232, respectively. The filters coupled to reference electrodes 250*a* and 250*b* are not shown in FIGS. 6A-6C to avoid overcomplicating the herein disclosure. Filter 232 is coupled to ionizing electrode 244 and connection 246.

Figure 6D:
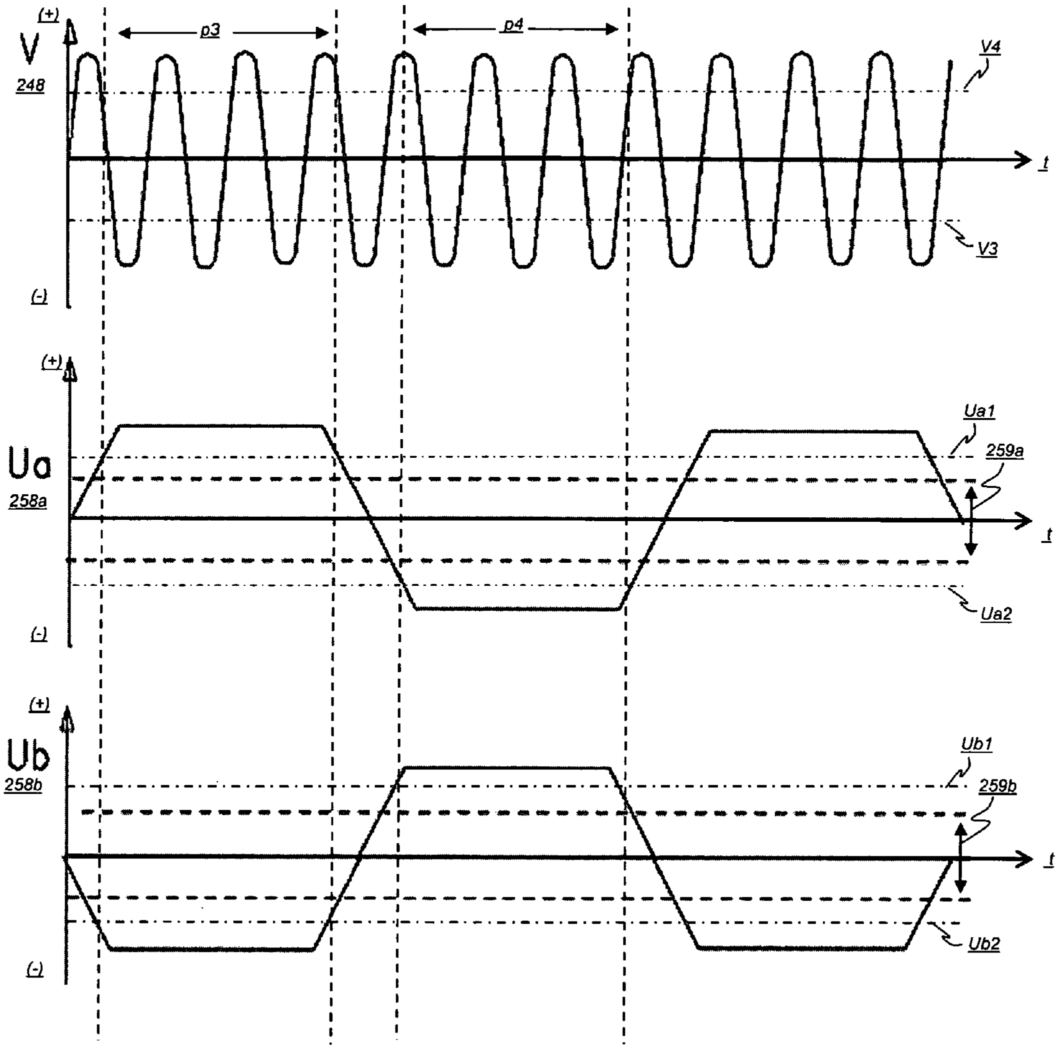

FIG. 6D shows the waveforms of an ionizing voltage 248 and voltages 258*a* and 258*b* that are intended to be used with the ionization cell described in FIGS. 6A-6C during static neutralization of a charged object 262, which has a charged surface 264 comprising a mix of negative and positive charges.

Ionizing voltage 248 is an alternating voltage having a frequency within the range of approximately 1 kHz to 30 kHz although this range is not intended to limit the invention in any way. Other ranges may be used, depending on the desired position of the respective weighted centers of bipolar ion clouds 274*a* and 274*b* within gaps 266*a* and 266*b*, respectively. To enhance the polarization of bipolar ion clouds 274*a* and 274*b* and hence, the dispersal of ions towards charged object 262, it is suggested that the respective weighted centers of the clouds be aligned with the center of polarizing electrodes 254*a* and 254*b* using empirical means or equation [1] as described previously above.

Voltages 258*a* (Ua) and 258*b* (Ub) each have a frequency in the range of 0.1 Hz to 500 Hz, preferably 0.1-100 Hz; a maximum peak voltage that may be less than ionization voltage and preferably less than the voltage required to create a corona discharge; and a trapezium waveform that are 180 degrees out of phase from each other. In this example, voltages 258*a* and 258*b* each have maximum peak voltages in the range of (+/−) 10 and 3000 V. Voltages 258*a* and 258*b* are hereinafter referred to as "polarizing voltages".

Using polarizing voltages having trapezium waveforms that are 180 degree out of phase results in the near continuous ion redistribution of ions within two oppositely charged bipolar ions clouds, while also increasing the static neutralization efficiency of charged objects having both positively and negatively charged surfaces. Providing closely positioned positive and negative ion clouds results in a low space charge magnitude, minimizing the possibility of overcharging the object targeted for static neutralization. Those of ordinary skill in the art would readily recognize after perusing the herein disclosure that other waveforms may be used that maximize the amount of time a polarization voltage may be held at a threshold sufficient to polarize ions. For instance, polarizing voltages 258*a* and 258*b* may be implemented in the form of two square waves with each polarizing voltage 180 degrees out of phase from each other.

Polarizing voltages 258*a* and 258*b* may also respectively include DC offsets 259*a* and 259*b*, which may be used to reduce space charge by adjusting the balance of negative and positive ions generated by corona discharge. The amount of DC offset used should be limited to a voltage range of between +/−10 and 3000V and should not exceed the voltage level necessary to initiate a corona discharge between the polarization electrodes and the reference electrodes.

Referring now to FIGS. 6A and 6D, ionizing voltage 248 reaches or exceeds negative corona threshold V3 and positive corona threshold V4 (see FIG. 6D) at least once, respectively, during time period p3. Ionizing voltage 248 creates ions by corona discharge each time ionizing voltage 248 reaches or exceeds V3 or V4, which are measured between ionizing electrode 244 and reference electrode 250*a* and between ionizing electrode 244 and reference electrode 250*b*, respectively. The alternating characteristic of ionizing voltage 248 creates a mix of negative and positive ions, referred to as bipolar ion clouds 274*a* and 274*b*, which respectively oscillate between ionizing electrode 244 and reference electrode 250*a* and between ionizing electrode 244 and reference electrode 250*b*.

Also, during time period p3, polarizing voltages 258*a* (Ua) and 258*a* (Ub) reach and exceed polarization thresholds Ua1 and Ub2, respectively. Upon reaching and exceeding these polarization thresholds, polarizing voltages 258*a* and 258*b* respectively polarize a sufficient number of ions from bipolar ion clouds 274*a* and 274*b* by causing these polarized ions to be redirected and displaced into separate regions in the respective bipolar ion clouds, transforming bipolar ion clouds into polarized ion clouds 275*a* and 275*b* (shown in FIG. 6B) and thus, increasing the ion neutralization and dispersal range of ionizing cell 242.

Bipolar ion cloud 274*a* becomes polarized ion cloud 275*a* when a sufficient number of negatively charged ions in cloud 274*a* are attracted to the positive electrical field (not shown) that is created between polarizing electrode 254*a* and reference electrode 250 when polarizing voltage 258*a* equals or exceeds Ua1. Polarization of ion cloud 274*b* also occurs when a sufficient number of positively charge ions from bipolar ion cloud 274*b* are repelled from the negative electrical field created between polarizing electrode 254*b* and reference electrode 250*b* when polarizing voltage 258*b* exceeds Ua2.

The polarization threshold voltages Ua1, Ua2 and Ub1, Ub2 may be within the range of 10-100V although this range is not intended to limit the disclosed embodiment in any way. These polarization threshold voltages are provided by way of example and may be any threshold amount that would be sufficient to polarize ions as described above.

During time period p4, ionizing voltage 248 continues to create ions by corona discharge each time ionizing voltage 248 reaches or exceeds V3 or V4, which are measured between ionizing electrode 244 and reference electrode 250*a* and between ionizing electrode 244 and reference electrode 250*b*, respectively. The alternating characteristic of ionizing voltage 248 creates a mix of negative and positive ions, shown as bipolar ion clouds 274*a* and 274*b* in FIG. 6A, which respectively oscillate between ionizing electrode 244 and reference electrode 250*a* and between ionizing electrode 244 and reference electrode 250*b*.

Also, during time period p4, polarizing voltages 258*a* (Ua) and 258*a* (Ub) reach and exceed polarization thresholds Ua1 and Ub2, respectively. Upon reaching and exceeding these polarization thresholds, polarizing voltages 258*a* and 258*b* respectively polarize a sufficient number of ions from bipolar ion clouds 274*a* and 274*b* by causing these polarized ions to be redirected and displaced into separate regions in the respective bipolar ion clouds, transforming bipolar ion clouds into polarized ion clouds 276*a* and 275*b* (shown in FIG. 6C) and thus, increasing the ion neutralization and dispersal range of ionizing cell 242.

Bipolar ion cloud 274*a* becomes polarized ion cloud 276*a* when a sufficient number of negatively charged ions in cloud 274*a* are attracted to the negative electrical field (not shown) that is created between polarizing electrode 254*a* and reference electrode 250 when polarizing voltage 258*a* equals or exceeds Ua2. Similarly, polarization of ion cloud 274*b* also occurs when a sufficient number of negatively charged ions from bipolar ion cloud 274*b* are repelled from the positive electrical field created between polarizing electrode 254*b* and reference electrode 250*b* when polarizing voltage 258*b* exceeds Ua1.

The use of polarizing voltages 258*a* an 258*b* further increases the ion dispersal range of ionizing cell 242 because, regardless of the polarity of the surface charge 264, the polarized ion clouds provide polarized ions of either polarity enabling these ions having a charge that is opposite of the charged surface 264 to be pulled towards the charge surface, increasing further the range and efficiency in which neutralizing ions can be dispersed toward a charged object or surface selected for static neutralization. Moreover, polarization of bipolar ion clouds 274*a* and 274*b* decreases ion recombination, which further still increases the efficiency of ionizing cell 242 to perform static neutralization since less electrical energy is needed to create ions that otherwise would have been lost due to ion recombination.

Figure 7:
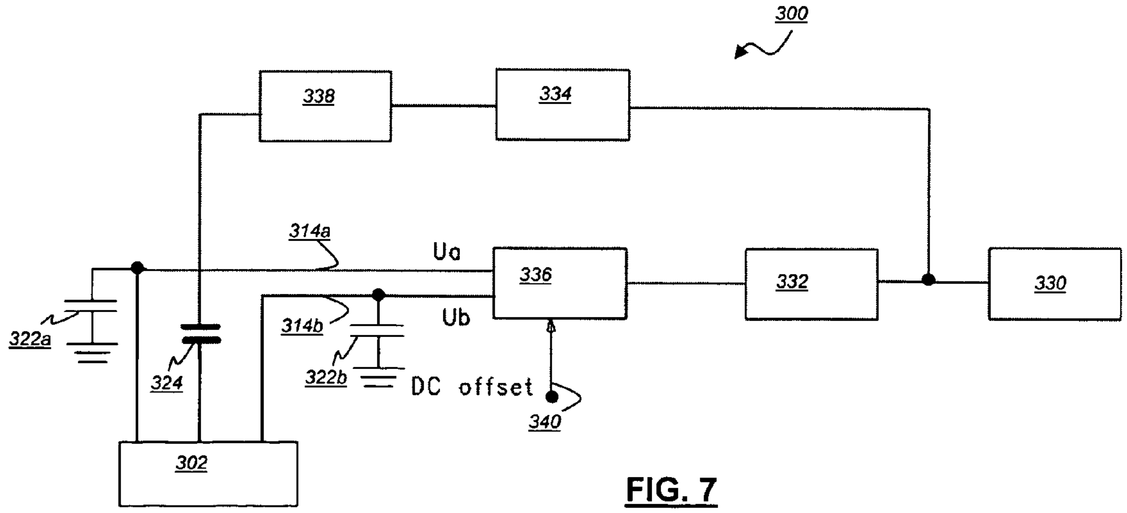
FIG. 7 is a schematic block diagram of a power supply in accordance with a sixth embodiment of the present invention.

In accordance with a seventh embodiment of the present invention, a schematic block diagram of a power supply 300 for use with an ionizing cell 302 that can receive two polarizing voltages is shown in FIG. 7. Power supply 300 includes a DC power supply 330, an adjustable frequency generator 332, a current regulator 334 and high voltage frequency generator 338, which substantially have the same elements and function described above for adjustable frequency generator 110, a current regulator 112 and high voltage frequency generator 118, respectively.

Power supply 300 also includes a high voltage amplifier 336 that generates two voltages 314*a* and 314*b* that are intended to be used as polarizing voltages for ionizing cell 302 and that respectively have electrical characteristics substantially similar to that described for ionizing voltages 258*a* and 258*b* above. High voltage amplifier includes a DC offset adjustment 340 that varies the DC offset value of voltage 314*a*, voltage 314*b* or both to set an ion balance for ionizing cell 302.

Ionizing cell 302 includes substantially the same elements and function of ionizing cell 242 described above. If ionizing cell 302 is not configured with filters 322*a*, 322*b* and 324, and if such filters are required, power supply 300 may also include filters 322*a*, 322*b* and 324. Filters 322*a* and 322*b* have substantially the same structure and function as filters 230*a* and 230*b*, while filter 324 has substantially the same structure and function as filter 232.

We claim:

1. An apparatus for neutralizing an electro-statically charged object at a first position, comprising:

a first electrode for receiving a first voltage;

a second electrode separated from said first electrode by a gap of a selected dimension;

a third electrode for receiving a third voltage;

said first voltage for creating an ion cloud having positive and negative ions and a weighted center located at a selected position within said gap when said first voltage is applied to said first electrode and a reference voltage is applied to said second electrode;

said third voltage for redistributing said positive and negative ions when said third voltage is applied to said third electrode; and wherein said first voltage has a first frequency, said third voltage has a second frequency, and wherein said first frequency is greater than said second frequency.

2. The apparatus of claim 1, wherein said third electrode includes a surface exposed to said gap.

3. The apparatus of claim 1, wherein said third electrode includes a surface having a center that is aligned with the center of said gap.

4. The apparatus of claim 1, wherein said ion cloud is a bipolar ion cloud.

5. The apparatus of claim 1, wherein said first electrode has a shape in the form of a filament.

6. The apparatus of claim 1, wherein said first electrode includes a tapered end terminating in the shape of a point.

7. The apparatus of claim 1, wherein said redistribution of said ions reshapes said ion cloud, causing a portion of said ion cloud to disperse closer to the first position.

8. The apparatus of claim 1, wherein said third voltage includes a DC-offset.

9. The apparatus of claim 1, wherein said first voltage has a frequency and amplitude that are selected so that said weighted center of said ion cloud is positioned at the approximate center of said gap.

10. An apparatus for neutralizing an electro-statically charged object at a first position, comprising:

a first electrode for receiving a first voltage;

a second electrode separated from said first electrode by a gap of a selected dimension;

a third electrode for receiving a third voltage;

said first voltage for creating an ion cloud having positive and negative ions and a weighted center located at a selected position within said gap when said first voltage is applied to said first electrode and a reference voltage is applied to said second electrode;

said third voltage for redistributing said positive and negative ions when said third voltage is applied to said third electrode; and wherein said first voltage has a first frequency within the range of 1 kHz to 30 kHz and said second voltage includes a second frequency within the range of 0.1 Hz and 500 Hz.

11. An apparatus for neutralizing an electro-statically charged object at a first position, comprising:

a first electrode for receiving a first voltage;

a second electrode separated from said first electrode by a gap of a selected dimension;

a third electrode for receiving a third voltage;

said first voltage for creating an ion cloud having positive and negative ions and a weighted center located at a selected position within said gap when said first voltage is applied to said first electrode and a reference voltage is applied to said second electrode;

said third voltage for redistributing said positive and negative ions when said third voltage is applied to said third electrode; and wherein said first voltage has a frequency and amplitude that are selected so that said weighted center of said ion cloud is positioned at the approximate center of said gap, said frequency and said amplitude selected using the equation:

$$V=u*F|G^2$$

where u is the average ion mobility of said positive and negative ions, F is said frequency, V is said amplitude and G is said selected dimension of said gap.

12. An apparatus for reducing an electrostatic charge on an object located at a first position, comprising:

a first electrode for receiving a first voltage;

a second electrode and third electrode for receiving a reference voltage, said second electrode separated from said first electrode by a first gap and said third electrode separated from said first electrode by a second gap;

said first voltage for creating a first set of positive and negative ions within said first gap and a second set of positive and negative ions within said second gap when said first voltage is applied to said first electrode;

a fourth electrode and a fifth electrode for receiving a second voltage; and said second voltage for redistributing said first and second sets of positive and negative ions when said second voltage is applied to said fourth and fifth electrodes.

13. The apparatus of claim 12, wherein said first electrode is an ionizing electrode, and said reference voltage is equal to ground and is used as a reference voltage for said first and second voltages.

14. The apparatus of claim 12, wherein said fourth electrode includes a first surface facing said first gap and said fifth electrode includes a second surface facing said second gap.

15. The apparatus of claim 12, wherein said fourth and fifth electrodes each has a center respectively aligned with the center of said first and second gaps.

16. The apparatus of claim 12, wherein said first voltage includes a first frequency, said second voltage includes a second frequency, and wherein said first frequency is greater than said second frequency.

17. The apparatus of claim 12, wherein said first voltage includes a first frequency within the range of 1 kHz to 30 kHz and said second voltage includes a second frequency within the range of 0.1 and 500 Hz.

18. An apparatus for neutralizing an electro-statically charged object located at a first position, comprising:

an ionizing electrode and a reference electrode spaced apart across a gap, said ionizing electrode for receiving a first voltage, and wherein said first voltage causes the generation of positive and negative ions substantially located at a selected position within said gap when said first voltage is applied to said ionizing electrode;

a polarizing electrode having a surface facing said gap and for receiving a second voltage, said second voltage for redistributing said positive and negative ions when applied to said polarizing electrode; and wherein said first voltage alternates at a first frequency selected to be within the range of 1 kHz to 30 kHz and said second voltage alternates at a second frequency selected to be within the range of 0.1 Hz to 500 Hz.

19. The apparatus of claim 18, wherein said first voltage alternates at a first frequency and said second voltage alternates at a second frequency.

20. The apparatus of claim 18, wherein said redistributing causes a portion of said positive ions to disperse closer to the first position.

21. The apparatus of claim 18, wherein said redistributing causes a portion of said negative ions to disperse closer to the first position.

22. The apparatus of claim 19, wherein said ionizing electrode has the shape of a filament.

23. An apparatus for reducing an electrostatic charge on an object located at a first position, comprising:

a first electrode for receiving a first voltage;

a second electrode and third electrode for receiving a reference voltage, said second electrode separated from said first electrode by a first gap and said third electrode separated from said first electrode by a second gap;

said first voltage for creating a first set of positive and negative ions within said first gap and a second set of positive and negative ions within said second gap when said first voltage is applied to said first electrode;

a fourth electrode for receiving a second voltage and a fifth electrode for receiving a third voltage;

said second voltage for redistributing said first set of positive and negative ions when said second voltage is applied to said fourth electrode; and said third voltage for redistributing said second set of positive and negative ions when said third voltage is applied to said fifth electrode.

24. The apparatus of claim 23, wherein said first electrode is an ionizing electrode, and said reference voltage is equal to ground and is used as a reference voltage for said first and second voltages.

25. The apparatus of claim 23, wherein said fourth electrode includes a first surface positioned to face said first gap and said fifth electrode includes a second surface position to face said second gap.

26. The apparatus of claim 23, wherein said first voltage includes a first frequency, said second voltage includes a second frequency, and wherein said first frequency is greater than said second frequency.

27. The apparatus of claim 23, wherein said first voltage includes a first frequency within the range of 1 kHz to 31 kHz and said second voltage includes a second frequency within the range of 0.1 and 500 Hz.

28. The apparatus of claim 23, wherein said first voltage includes a first frequency, said second voltage includes a second frequency, and said third voltage includes a third frequency.

29. The apparatus of claim 23, wherein said first voltage has a first frequency, said second voltage has a second frequency, and said third voltage has a third frequency; and wherein said first frequency is greater than said second and third frequencies.

30. The apparatus of claim 23, wherein said second and third voltages respectively alternate at frequencies that are 180 degrees out of phase.

31. The apparatus of claim 23, wherein said second and third voltages respectively have trapezium waveforms.

32. The apparatus of claim 23, wherein said second and third voltages respectively have square wave waveforms.

33. The apparatus of claim 23, wherein said first and second gaps are substantially equal and said first voltage has a frequency and a voltage, and said weighted centers of said first and second sets of positive and negative ions are positioned at the approximate centers of said first and second gaps, respectively, by selecting said frequency and said amplitude using the equation:

$$V=u*F|G^2$$

where u is the average ion mobility of said positive and negative ions, F is said frequency, V is said amplitude and G is said selected dimension of said first gap.

* * * * *